United States Patent [19]

Ady et al.

[11] Patent Number: 5,625,238

[45] Date of Patent: Apr. 29, 1997

[54] APPARATUS FOR NON-DISRUPTIVELY INTERCONNECTING PERPHERAL DEVICE MODULES WITH A HOST DEVICE

[75] Inventors: Roger W. Ady, Lisle; Charles D. Hood, III, Elmhurst; William R. Groves, Naperville, all of Ill.

[73] Assignee: Motorola, Inc., Schaumburg, Ill.

[21] Appl. No.: 383,394

[22] Filed: Feb. 3, 1995

[51] Int. Cl.$^6$ ..................... G06F 13/00
[52] U.S. Cl. .............. 307/147; 395/283; 439/377; 361/781
[58] Field of Search .............. 307/147; 361/58, 361/100, 62, 118, 391, 393, 394, 748, 752, 756, 760, 781; 395/325, 500, 750, 800, 280, 281, 282, 283; 439/377, 59, 61, 62, 64, 327, 328, 325

[56] References Cited

U.S. PATENT DOCUMENTS

| | | | |
|---|---|---|---|
| 4,835,737 | 5/1989 | Herrig et al. | 364/900 |
| 5,277,615 | 1/1994 | Hastings et al. | 439/377 |
| 5,317,697 | 5/1994 | Husak et al. | 395/325 |
| 5,325,951 | 7/1994 | Ady | 193/1 |
| 5,473,499 | 12/1995 | Weir | 361/58 |
| 5,530,302 | 6/1996 | Hamre et al. | 307/147 |

*Primary Examiner*—William M. Shoop, Jr.
*Assistant Examiner*—Jonathan Kaplan
*Attorney, Agent, or Firm*—Donna Maddox

[57] ABSTRACT

The apparatus permits non-disruptive addition and removal of PCMCIA modules from a host device. The host device includes a signal bus connected to mating pins of the card header. The card header has a three-sided frame into which a module is inserted. A switch disposed on an edge of the header is responsive to insertion and de-insertion of the module. The length of the mating pins vary where selected mating pins of the card header have a first length for detecting substantially complete insertion and partial de-insertion of the module, and pins of a second length for applying bus signals to the module. Pins of a third length facilitate applying electrical power to the module. The computer is responsive to the switch and the mating pins such that the signal bus is deactivated to prevent corruption of the bus signals when the switch detects insertion of the module. The signal bus remains deactivated until the module is in communication with pins of a first length, whereupon the signal bus is then reactivated. This prevents electrical transients from reaching the bus. Additionally, the signal bus is deactivated upon partial de-insertion of the module when the module is no longer in communication with pins of first length. The signal bus remains deactivated until the switch detects complete de-insertion of the module, whereupon the signal bus is then reactivated.

15 Claims, 3 Drawing Sheets

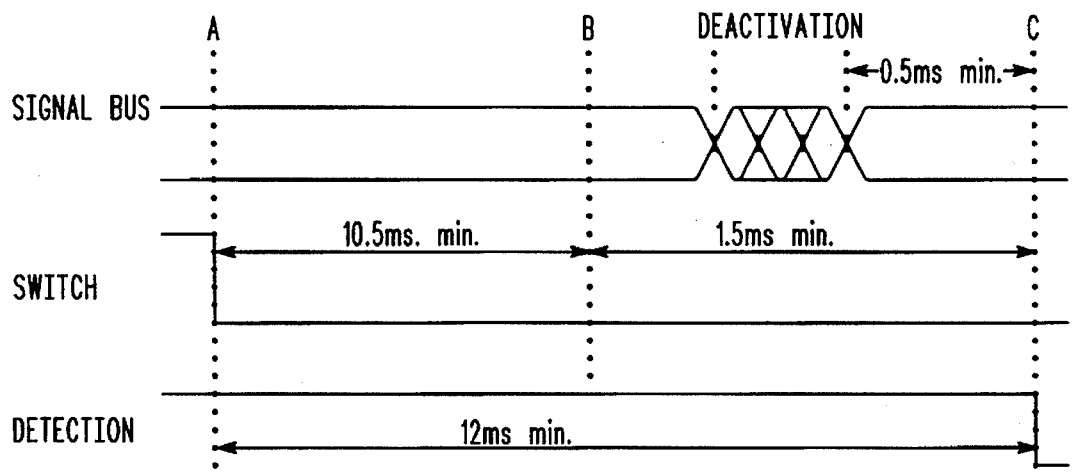
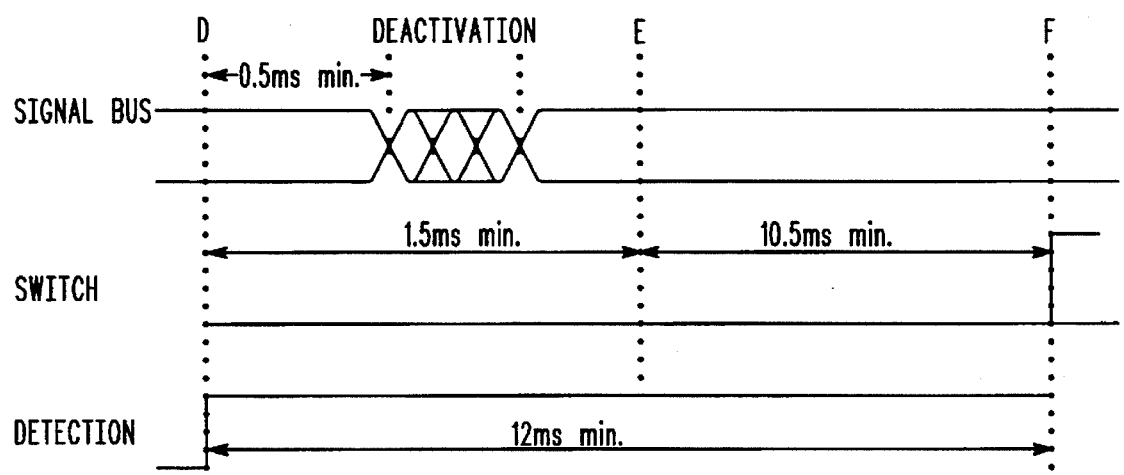

APPARATUS FOR NON-DISRUPTIVELY INTERCONNECTING PERPHERAL DEVICE MODULES WITH A HOST DEVICE

BACKGROUND OF THE INVENTION

The field of the invention relates to devices having a memory, and more particularly to a method and apparatus for the non-disruptive exchange of PCMCIA interface devices and modules interconnected with one or more devices having a memory.

Standardization of interfaces for devices having a memory, for example, computers, at a board level has been an area of intense interest in recent years. Standardization of such connections permit convenient connection of external peripheral devices, such as modems, disk drives, and memory modules, with the device having a memory, for example a computer. The continuing trend towards smaller, faster, and lighter computers has resulted in the development of laptop, notebook, and handheld computers. An interface standard for interfacing small peripheral devices to small computer systems such as handheld and notebook computers, has been provided by the Personal Computer Memory Card International Association (PCMCIA) of Sunnyvale California. A description of the physical structure of the PCMCIA interface may be found in PCMCIA publication D-204.

In addition to conventional portable computer systems, miniaturization of microcomputers has led to the incorporation of microcomputers into a number of consumer items such as electronic hand held devices, such as personal digital assistants, facsimile devices, video games, and the like. The use of the PCMCIA card or module in such applications permits the exchange of data and software between the card, or module and the host device, a device having a memory, for example a computer.

One difficulty inherent in the use of conventional PCMCIA cards, or modules, lies in the need to deactivate a device before inserting or removing a PCMCIA card, or module. It is known that failing to deactivate a processor may lead to disruption of the processor operation due to transients generated during module insertion or removal. Because of the importance of computing devices using PCMCIA modules, A need exists for an apparatus for adding, removing, and interconnecting PCMCIA cards, or modules, with one or more host devices without causing disruption, corruption, or lost data on the host device.

Accordingly, an apparatus for non-disruptively interconnecting PCMCIA, cards, or modules, from a host device is needed. It is desirable that such an apparatus allow modules to be added to and removed from one or more host devices without requiring the removal of electrical power. Additionally, such an apparatus must allow the host device to detect when modules are inserted and removed.

BRIEF DESCRIPTION OF THE DRAWINGS

The features of the present invention which are believed to be novel are set forth with particularity in the appended claims. The invention, together with further objects and advantages thereof, may best be understood by reference to the following description in conjunction with the accompanying drawings.

FIG. 3a depicts a timing diagram of a specific embodiment of the present invention illustrating insertion of a module into the card header in accordance with the present invention.

FIG. 3b depicts a timing diagram of a specific embodiment of the present invention illustrating de-insertion of a module from the card header in accordance with the present invention.

DETAILED DESCRIPTION OF THE INVENTION

Generally, the present invention permits non-disruptive addition and removal of PCMCIA card, or modules from a plurality of mating pins within a card header attached to an a host device, such as a computer having a signal bus in communication with the mating pins of the card header.

In one embodiment, the card header has a three-sided frame with a set of parallel guide rails, a back rail connecting the two parallel rails, and an open end opposite the back rail. A switch disposed on an inside edge of one of the guide rails is positioned between the back rail and the open end, and is responsive to insertion and de-insertion of a module into the card header. The length of the mating pins vary where selected mating pins of the card header have a first length for detecting substantially complete insertion and partial de-insertion of the module, and pins of a second length for applying bus signals to the module. Pins of a third length facilitate applying electrical power to the module.

The host device is responsive to the switch and the mating pins such that the signal bus is temporarily deactivated to prevent corruption of the bus signals when the switch detects insertion of the module. Deactivation may be accomplished by deactivation of the entire bus through buffer devices or through deactivation of selected signals such as chip select and enable signals. The signal bus remains deactivated until the module is fully inserted and is in communication with pins of a first length, whereupon the signal bus is then reactivated. This prevents electrical transients from reaching the bus. Additionally, the signal bus is deactivated upon de-insertion of the module when the module is no longer in communication with pins of first length. The signal bus remains deactivated until the switch detects complete de-insertion of the module, whereupon the signal bus is then reactivated.

The present invention provides an apparatus for non-disruptively adding and removing modules from a card header that is reliable and inexpensive to manufacture. A switch is located on the card header instead of on the module. This saves valuable area on the module where it is advantageous to devote module area to semiconductor devices or associated electronics. Additionally, when the switch is located on a guide rail of the connector, header, instead of the module, precise alignment is obtained.

Figure 1:
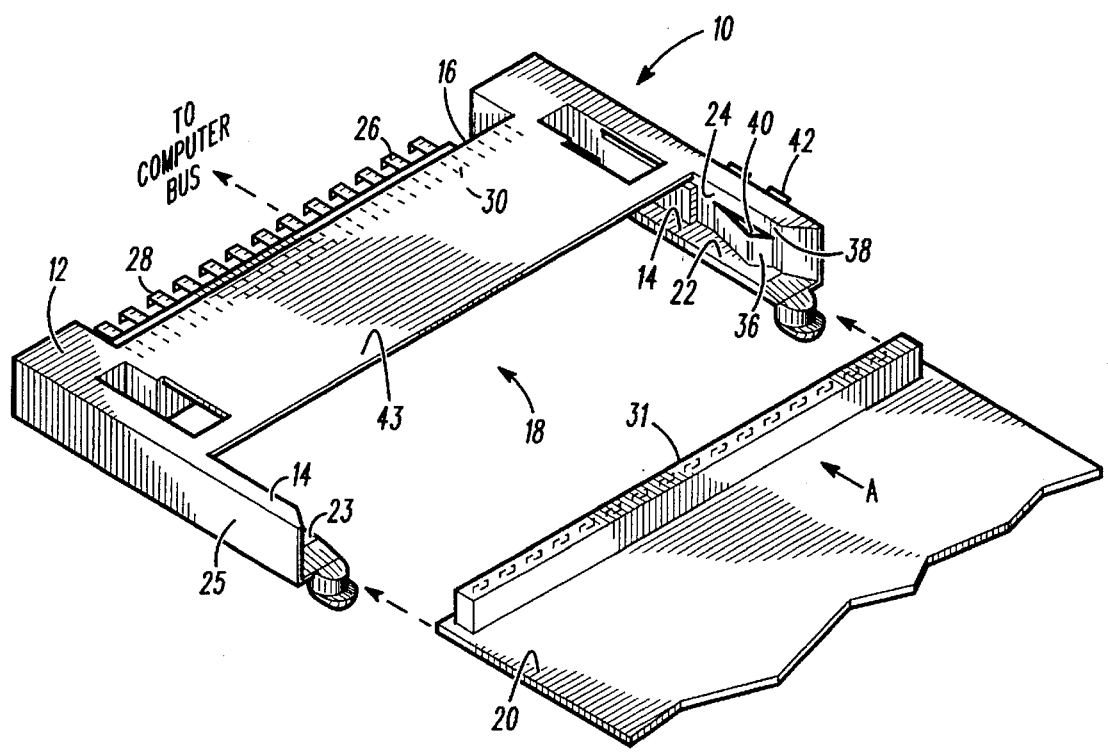
FIG. 1 is a perspective view of a specific embodiment of the present invention depicting the card header, switch, and mating pins.
Figure 2:
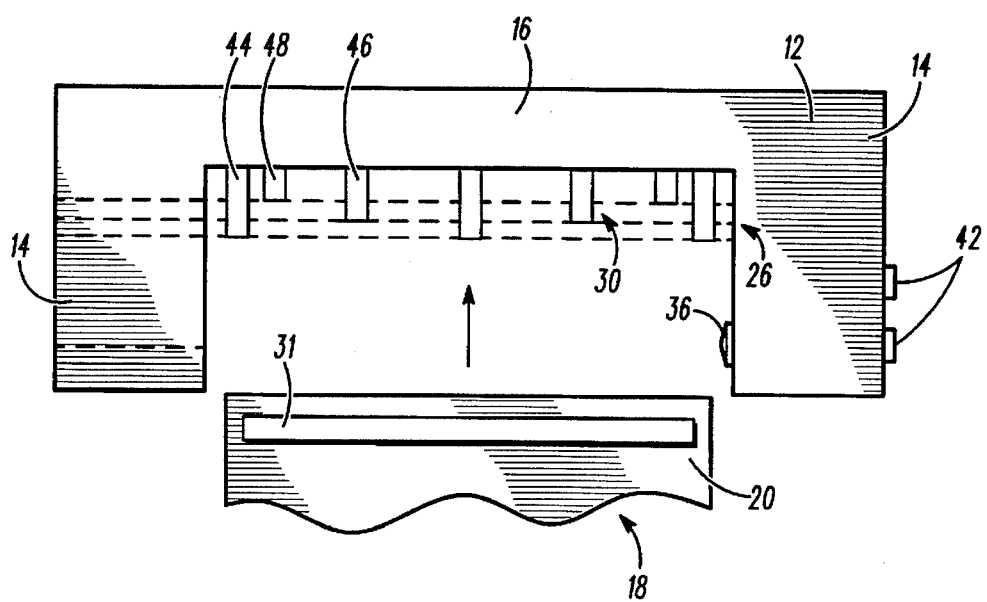
FIG. 2 is a top plan view partially cut away, of a specific embodiment of the present invention depicting the mating pins.

Referring now to FIGS. 1 and 2, a PCMCIA type card header is shown generally as 10. Card headers are generally known in the art and may be of the type described in greater detail in U.S. Pat. No. 5,325,951 issued on Jul. 5, 1994 and incorporated by reference herein.

The card header 10 is constructed in accordance with a specific embodiment of the present invention and has a three sided frame 12 having two parallel guide rails 14 and a back rail 16 connecting the two guide rails. An open end 18, disposed opposite the back rail 16 permits a module 20 or card to be inserted into the header 10 in the direction generally shown by arrow "A". The card header 10 is mechanically fastened to the computer or motherboard by, for example, splitposts, chemical adhesives, alignment pins, or any other suitable method (not shown).

The guide rails 14 have horizontal surfaces 22 and 23 and vertical surfaces 24 and 25 which act to guide the module 20 into the card header 10 and retain the module therein. A group of mating pins 26 mounted within the back rail 16 extends parallel to the guide rails 14 and extends transversely from the back rail. A portion 28 of the mating pins extend beyond the back rail 16 to facilitate attachment of the mating pins to the signal bus 29 of a computer or motherboard by means of soldering or other means well known in the art. The opposite ends 30 of the mating pins extend within the card header 10 from the back rail 16 toward the open end 18 of the card header and mate with a module header 31 attached to the module 20 that is inserted into the card header. Insertion of the module 20 thus completes the electrical connection between signals on the module and signals on the bus 29. (e.g. computer bus or other digital circuit bus)

A switch 36 located on an inside edge 38 of the vertical surfaces 24 or 25 of one of the guide rails 14 provides an indication of whether a module 20 is present within the card header 10. The switch 36 is a normally open switch and has flexible electrical contacts 40 extending from the vertical surface 24 of the guide rail 14 which contact an edge of the module 20 when the module is inserted into the header 10. The electrical contacts 40 terminate as stubs 42 or switch posts disposed on an outside edge of the guide rail 14. The stubs 42 are connected to the signal bus 29 or motherboard by wires or a direct solder connection as is well known in the art. When a module 20 is inserted into the card header 10, the electrical contacts 40 physically deform, thus, making electrical contact that may be easily sensed by the computer.

Alternatively, the switch 36 may be a normally closed switch that is forced into an open position upon insertion of the module 20 into the card header 10. Detection of a normally open or normally closed position of the switch 36 is performed by the computer. However, the switch 36 is not limited to contact type switch and may be of a non-contact type such as an optical switch or a capacitive switch as is well known in the art. In addition, the switch may be located in other locations and such as a cross-panel 43, or any other location suitable for detecting insertion of the module 20.

As best seen in FIG. 2, the portion of the mating pins 30 that extend toward the open end 18 of the card header 10 are shown. These pins 30 contact the module 20 when the module 20 is inserted into the card header 10 and are formed from three different lengths as is described in PCMCIA interface publication D-204.

Power pins 44 are the longest in length and provide electrical power to the module 20. When the module 20 is initially inserted into the card header 10, the power pins 44 contact the module 20 before any of the other pins, thus, supplying electrical power to the module 20. As the module 20 is further inserted into the card header 10, signal pins 46 of an intermediate length next contact the module 20. These pins permit connection of bus and logic signals between the module 20 and the computer bus 29 or motherboard. Upon full insertion of the module 20 into the card header 10, detection pins 48, whose length is shorter than the power pins 44 and the signal pins 46 contact the module 20. Since these pins are shortest in length, contact between the module 20 and these pins indicates full insertion of the module 20 into the card header 10. Such contact is detected by the computer by means well known in the art.

As the module 20 is inserted into the card header 10, contact with various mating pins 26 may cause electrical transients or glitches on the computer bus 29. This often disrupts the system and causes errors, data corruption, or circuit board damage. Typically, the host device must be shut-off or re-booted to correct these errors. However, if the computer bus 29 can be inhibited or disabled during the period of time that the transients exist, no disruption of the computer occurs.

Referring now to FIGS. 2, 3a, and 3b it has been empirically determined that module 20 insertion and de-insertion occurs at speeds up to one meter per second. Thus, minimum and maximum timing criteria shown in FIGS. 3a and 3b reflect the maximum insertion and de-insertion speeds. Of course, this also depends upon the placement of the switch 36 relative to the mating pins 26, since the further the switch is placed from the back rail 16, the greater the period of time between initial switch contact and full insertion of the module 20 into the card header 10.

Signal timing for insertion of the module 20 into the card header 10 is shown in FIG. 3a. The line labeled SIGNAL BUS represents the signals on the computer bus 29. The line labeled SWITCH shows the state of the switch 36, while the line labeled DETECTION represents the state of the detection pins 48 or the shortest pins within the card header 10. Time "A", denoted by a vertical dotted line, represents the time when the module 20 is inserted into the card header 10 and contacts the switch 36. Time "B", denoted by a vertical dotted line, represents the time when transients may appear on the SIGNAL BUS. Time "C", denoted by a vertical dotted line, represents the time when the module 20 is fully inserted into the card header 10 and contacts the detection pins 48.

It has been determined for the illustrated embodiment that at maximum insertion speeds (e.g. one meter per second), transients will not appear on the SIGNAL BUS for a predetermined number of milliseconds after the module 20 activates the switch 36. The amount of time is variably dependent on the host device hardware and software. In the preferred embodiment illustrated that at a maximum insertion speed transients will not appear on the SIGNAL BUS for at least between 8 and 14 milliseconds after the module 20 activates the switch 36. Preferably, at least 10.5 milliseconds after the module 20 activates the switch 36. This depends upon the maximum insertion speed and the distance that the module 20 must travel before making contact with the signal pins 46. Time "B" also approximates the time when the power pins 44 contact the module 20 since these pins are of greatest length and are the first pins to contact the module upon insertion. Transients do not appear on the SIGNAL BUS any earlier than time "B", since electrical power is not connected to the module 20 until that time. Accordingly, in the illustrated embodiment, the switch 36 is preferrably located within a distance from the back rail 16 to comply with the timing constraints shown in FIGS. 3a and 3b. This distance is dependant on the acceptable tolerance of a preferred embodiment and will vary according to the tolerances of the embodiment. In the preferred embodiment illustrated, the switch 36 is preferrably located within zero to seven centimeters from the back rail 16 to comply with the timing constraints shown in FIGS. 3a and 3b and with the one meter per second maximum insertion and de-insertion speed.

Accordingly, upon SWITCH activation at time "A", the computer receives an interrupt and must then begin to disable the signal bus 29. The computer has approximately 10.5 milliseconds to perform the disable function. Once the signal bus is disabled, transients appearing on the SIGNAL BUS do not disrupt the computer. At maximum insertion speed (e.g. one meter per second), the transients may exist for approximately 1.0 milliseconds after time "B", when the power pins contact the module 20. However, even if transients appear for greater than 1.0 milliseconds after time "B", the computer will not reenable the SIGNAL BUS until the module 20 is fully inserted, as shown at time "C". At time "C", DETECTION is asserted when the detection pins 48 or the shortest pins, mate with the module 20. Such a condition indicates full insertion of the module 20 into the card header 10.

Since the signal pins 46 are of intermediate length, that is, shorter than the power pins 44 but longer than the detection pins 48, the signals present on the signal pins may be unstable once power is applied to the module 20 through the power pins. However, they are guaranteed to be stable by the time that the detection pins contact the module 20. This follows since physical connection from the computer bus 29 to the module 20 through the signal pins 46 has had time to stabilize by the time that the module 20 has been inserted sufficiently to contact the detection pins 48. As shown, the signals on SIGNAL BUS will be stable at least 0.5 milliseconds prior to time "C" when the module 20 contacts the detection pins 48.

Alternatively, the computer bus 29 need not be disabled and enabled by the computer. Rather logic circuits, such as tri-state bi-directional buffers located directly on the card header 10 may enable and disable signals between the module 20 and the bus 29 in response to the switch 36, when the module is inserted and de-inserted.

Although FIG. 3a shows that the SIGNAL BUS is free from transients for at least 0.5 milliseconds prior to DETECTION being asserted, the computer will not reactivate the SIGNAL BUS until full insertion of the module 20 occurs at time "C". At maximum insertion speed of about one meter per second, the time from switch activation at time "A" to full insertion at time "C" is at least 12 milliseconds, in the illustrated embodiment.

As best shown in FIG. 3b, signal timing for de-insertion or removal of the module 20 from the card header 10 is shown. The horizontal lines SIGNAL BUS, SWITCH, and DETECTION are identical to the horizontal lines shown in FIG. 3a and are identically labeled. Time "D", denoted by a vertical dotted line, represents the time when the module 20 is de-inserted from the card header 10 and breaks contact with the detection pins 48 (DETECTION). After time "D", transients may appear on the SIGNAL BUS within 0.5 milliseconds. Time "E", denoted by a vertical dotted line, represents the time when transients no longer appear on the SIGNAL BUS. Time "F", denoted by a vertical dotted line, represents the time when the module 20 is fully de-inserted from the card header 10 and changes the state of the switch 36.

At maximum de-insertion speed of about one meter per second, transients will not appear on the SIGNAL BUS for at least 0.5 milliseconds after the module 20 breaks contact with the detection pins 48, as shown between times "D" and "E" and on the line labeled DETECTION. Since the detection pins 48 are the shortest in length, removal of the module 20 from the card header 10 activates the DETECTION signals first. Upon activation of the DETECTION signal, the computer disables the computer bus 29 via an interrupt and has approximately 0.5 milliseconds to perform the disable function before transients may appear. Once the SIGNAL BUS is disabled, transients appearing on the SIGNAL BUS between times "D" and "E" are incapable of disrupting the computer.

At time "E", the signal pins 46, or pins of intermediate length break contact with the module 20. Thus, after time "E" no further transients can appear on the SIGNAL BUS since there is no connection to the computer bus 29. Transients may exist on the SIGNAL BUS for a minimum of 1.5 milliseconds, during which time, the SIGNAL BUS is disabled. At least 10.5 milliseconds will elapse until the module 20 is withdrawn sufficiently to allow the switch 36 to change states, as shown at time "F". Once the switch 36 changes state, indicating full removal of the module 20, the computer will reenable the SIGNAL BUS and will resume normal processing activity.

Figure 4A:
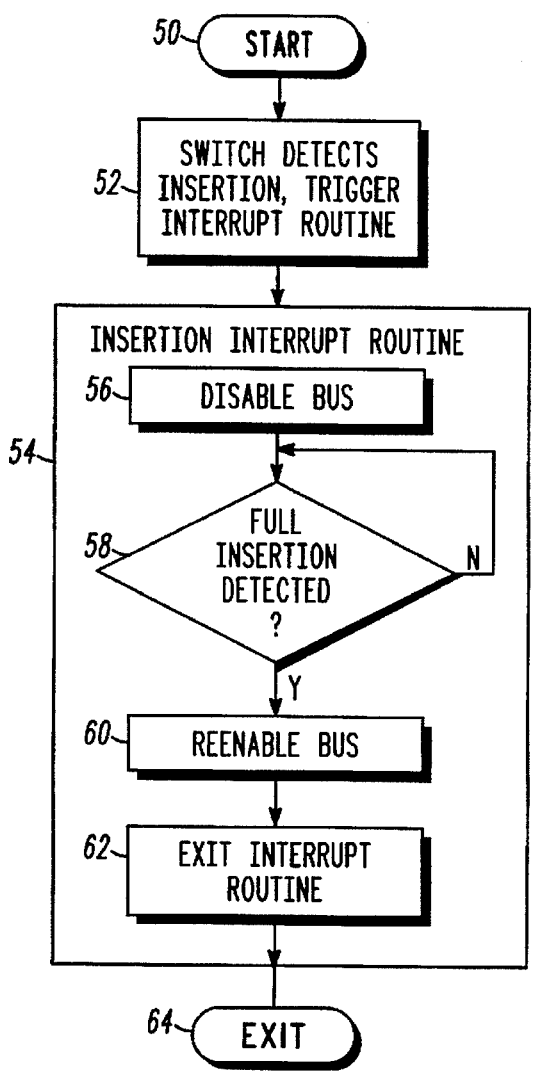
FIG. 4a shows a flowchart depicting insertion of a module according to a specific embodiment of the present invention.

Referring now to FIGS. 1 and 4a, FIG. 4a is a flowchart depicting operation of insertion of the module 20 into the card header 10. As shown in step 50 the routine begins, and in step 52 the switch 36 detects initial insertion of the module 20, and triggers execution of an insertion interrupt routine 54. The insertion interrupt routine, shown as block 54, includes several submodules. Upon entry into the insertion interrupt routine 54, the computer bus 29 is disabled, as shown in step 56. Next, as shown in step 58, the routine loops continuously if full insertion of the module 20 is not yet detected. Full insertion of the module is detected when module 20 makes contact with the shortest pins in the header 10. Once full insertion of the module 20 has been detected, the computer bus 29 is reenabled, as shown in step 60, and the insertion interrupt routine 54 exits, as shown in step 62. After exiting the insertion interrupt routine 54, control is transferred back to the point before the insertion interrupt routine was triggered, as shown in step 64.

Figure 4B:
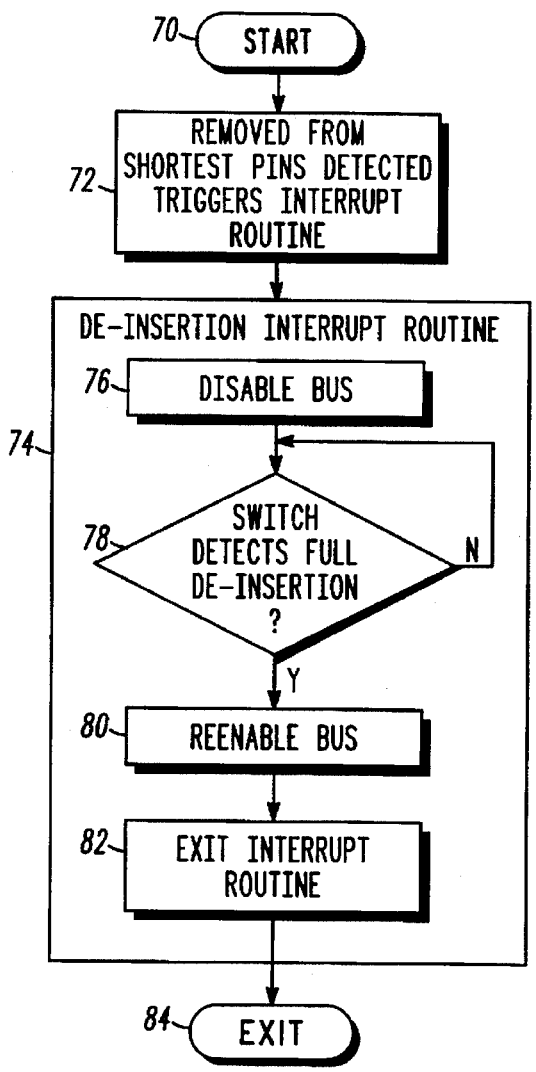
FIG. 4b shows a flowchart depicting de-insertion of a module according to a specific embodiment of the present invention.

Referring now to FIGS. 1 and 4b, FIG. 4b is a flowchart depicting operation of de-insertion of the module 20 from the card header 10. As shown in step 70 the routine begins, and in step 72 removal of the module 20 causes the shortest pins of the header 10 to break contact with the module. De-insertion of the module 20 is detected by the computer bus 29 and a de-insertion interrupt routine 74 is triggered. The de-insertion interrupt routine, shown as block 74 includes several submodules. Upon entry into the de-insertion interrupt routine 74, the computer bus 29 is disabled, as shown in step 76. As shown in step 78, the routine loops continuously if full de-insertion of the module 20 is not detected. Full de-insertion of the module 20 is detected when module 20 causes the switch 36 to change states by removal of the module 20. Once full de-insertion of the module 20 has been detected, the computer bus 29 is reenabled, as shown in step 80 and the interrupt routine 74 exits, as shown in step 82. After exiting the de-insertion interrupt routine 74, control is transferred back to the point before the de-insertion interrupt routine was triggered, as shown in step 84.

A specific embodiment of the apparatus for non-disruptively adding and removing PCMCIA modules from a host device, such as a computer according to the present invention has been described for the purpose of illustrating the manner in which the invention may be made and used. It should be understood that implementation of other variations and modifications of the invention and its various aspects will be apparent to those skilled in the art, and that the invention is not limited by these specific embodiments described. It is therefore contemplated to cover by the present invention any and all modifications, variations, or equivalents that fall within the true spirit and scope of the basic underlying principles disclosed and claimed herein.

What is claimed is:

1. An apparatus for non-disruptively adding and removing peripheral device modules from a card header of a digital circuit, the digital circuit having a signal bus in communication with the card header, the card header having a three-sided frame with a set of parallel guide rails, a back rail connecting the two parallel rails, and an open end disposed opposite the back rail, the apparatus comprising:

a switch coupled to the digital circuit disposed between the back rail and the open end, the switch responsive to physical insertion and de-insertion of the module;

a plurality of mating pins mounted on the card header wherein selected mating pins of the plurality of mating pins are coupled to the signal bus and at least one selected mating pin of the card header has a first length for detecting substantially complete insertion and de-insertion of the module;

the digital circuit comprising circuitry responsive to the switch and mating pins such that the signal bus is deactivated to prevent corruption of the bus signals when the switch responds to insertion of the module, the signal bus remaining deactivated until the module is in communication with the at least one pin of first length, whereupon the signal bus is reactivated, and responsive to the switch and mating pins such that the signal bus is deactivated to prevent corruption of the signals when the module is no longer in communication with the at least one pin of first length, the signal bus remaining deactivated until the switch detects de-insertion of the module, whereupon the signal bus is reactivated.

2. The apparatus according to claim 1 wherein the plurality of mating pins further include pins of second length for applying bus signals to the module, and pins of third length for applying electrical power to the module.

3. The apparatus according to claim 2 wherein mating pins of third length are longer than the at least one mating pin of first length.

4. The apparatus according to claim 1 wherein the time from the switch detecting insertion of the module to when the module is in communication with the at least one pin of first length at an insertion speed of up to one meter per second is at least about 12 milliseconds.

5. The apparatus according to claim 1 wherein the time from the switch detecting insertion of the module to deactivation of the signal bus at an insertion speed up to one meter per second is at least is about 10.5 milliseconds.

6. The apparatus according to claim 1 wherein the time from when the module is no longer in communication with pins of first length due to partial de-insertion of the module, to deactivation of the signal bus at a de-insertion speed up to one meter per second is at least about 0.5 milliseconds.

7. The apparatus according to claim 1 wherein the switch is a single-pole single throw switch.

8. The apparatus according to claim 1 wherein the switch is in a closed position when a module is inserted and is in an open position when a module is not inserted.

9. The apparatus according to claim 1 wherein the switch is in an open position when a module is inserted and is in a closed position when a module is not inserted.

10. The apparatus according to claim 1 wherein the switch is positioned between about zero and seven centimeters from the back rail.

11. The apparatus according to claim 1 wherein the switch is positioned on a guide rail.

12. The apparatus according to claim 1 wherein the switch is positioned between the two guide rails.

13. The apparatus according to claim 1, wherein the open end of the card header is dimensioned to receive a peripheral device module conforming with Personal Computer Memory Card International Association standard dimensions.

14. The apparatus according to claim 1, wherein the switch is a contact switch.

15. The apparatus according to claim 1, wherein at least two selected mating pins of the card header have a first length and the circuitry of the digital circuit is responsive to the switch and mating pins such that upon insertion of the module, the signal bus remains deactivated until the module is in communication with the at least two pins of first length, whereupon the signal bus is reactivated, and responsive to the switch and mating pins such that the signal bus is deactivated to prevent corruption of the signals when the module is no longer in communication with the at least two pins of first length.

* * * * *